United States Patent
Zuckerman et al.

(10) Patent No.: US 6,514,362 B1
(45) Date of Patent: Feb. 4, 2003

(54) FABRIC COATING CONTAINING ENERGY ABSORBING PHASE CHANGE MATERIAL AND METHOD OF MANUFACTURING SAME

(75) Inventors: Joseph L. Zuckerman, Livingston, NJ (US); Robert J. Pushaw, Havertown, PA (US); Bernard T. Perry, Boulder, CO (US); Daniel M. Wyner, North Scitvate, RI (US)

(73) Assignees: Outlast Technologies, Inc., Boulder, CO (US); R.H. Wyner Associates, Inc., West Bridgewater, MA (US)

( * ) Notice: Subject to any disclaimer, the term of this patent is extended or adjusted under 35 U.S.C. 154(b) by 38 days.

(21) Appl. No.: 09/697,699

(22) Filed: Oct. 25, 2000

Related U.S. Application Data (60) Division of application No. 08/477,824, filed on Jun. 7, 1995, now abandoned, which is a continuation-in-part of application No. 08/259,964, filed on Jun. 14, 1994, now abandoned.

(51) Int. Cl.⁷ .............................................. B32B 31/12
(52) U.S. Cl. ..................... 156/79; 156/237; 156/238; 156/247; 264/53; 428/352
(58) Field of Search ................................. 156/237–240, 156/247, 241, 78, 79, 231; 428/352, 51–55

(56) References Cited

U.S. PATENT DOCUMENTS

| | | |
|---|---|---|
| 3,615,972 A | 10/1971 | Morehouse, Jr. et al. |
| 3,769,126 A | 10/1973 | Koelek |
| 3,852,401 A | 12/1974 | Suzuki et al. |
| 4,003,426 A | 1/1977 | Best et al. |
| 4,006,273 A | 2/1977 | Wolinski et al. |
| 4,027,345 A * | 6/1977 | Fujisawa et al. ............ 101/470 |
| 4,094,685 A | 6/1978 | Lester et al. |
| 4,208,485 A | 6/1980 | Nahta |

(List continued on next page.)

FOREIGN PATENT DOCUMENTS

| | | |
|---|---|---|
| JP | SHO 53-034863 | * 3/1978 |
| JP | SHO 56-30473 | 3/1981 |
| JP | SHO 63-217196 | * 9/1988 |
| JP | HEI 5-156570 | 6/1993 |
| JP | HEI 05-247854 | * 9/1993 |
| WO | WO 93/24241 | 12/1993 |

OTHER PUBLICATIONS

"Innovative Protective Clothing: PCM microcapsules as Barrier for Optimized Cold Protection", Techtextil–Telegramm, Mar. 28, 1994, pp. 2–3, Frankfurt, Germany.*
"Fabric given enhanced thermal properties", Chemical & Engineering News, p. 15 Oct. 20, 1986, Washington, DC.*
George and Shepard, "Phase Change Wallboard For Peak Demand Reduction", Tech Memo © Aug. 1993.*
"How to Wrap a Home in Energy Savings", Oct. 1993, Tyvek® Housewrap, Du Pont, Wilmington, Delaware.*

(List continued on next page.)

Primary Examiner—Sam Chuan Yao
(74) Attorney, Agent, or Firm—Cooley Godward LLP (57) ABSTRACT

A coating composition for fabrics includes wetted microspheres containing a phase change material dispersed throughout a polymer binder, a surfactant, a dispersant, an antifoam agent and a thickener. Preferred phase change materials include paraffinic hydrocarbons. The microspheres may be microencapsulated. To prepare the coating composition, microspheres containing phase change material are wetted and dispersed in a dispersion in a water solution containing a surfactant, a dispersant, an antifoam agent and a polymer mixture. The coating is then applied to a fabric. In an alternative embodiment, an extensible fabric is coated with an extensible binder containing microencapsulated phase change material to form an extensible, coated fabric. The coated fabric is optionally flocked. The coated fabrics are manufactured using transfer techniques.

5 Claims, 1 Drawing Sheet

U.S. PATENT DOCUMENTS

| | | |
|---|---|---|
| 4,208,486 A | 6/1980 | Nahta |
| 4,357,428 A | 11/1982 | Watson et al. |
| 4,446,917 A | 5/1984 | Hayes |
| 4,504,402 A | 3/1985 | Chen et al. |
| 4,531,511 A | 7/1985 | Hochberg |
| 4,572,864 A | 2/1986 | Benson et al. |
| 4,581,285 A | 4/1986 | Mahefkey, Jr. |
| 4,587,279 A | 5/1986 | Salyer et al. |
| 4,600,644 A * | 7/1986 | Bromley et al. ............ 428/399 |
| 4,612,239 A | 9/1986 | Dimanshteyn et al. |
| 4,617,332 A | 10/1986 | Salyer et al. |
| 4,645,613 A | 2/1987 | Harvey et al. |
| 4,711,813 A | 12/1987 | Salyer |
| 4,747,240 A | 5/1988 | Voisinet et al. |
| 4,756,958 A | 7/1988 | Bryant et al. |
| 4,774,133 A | 9/1988 | Doree |
| 4,797,160 A | 1/1989 | Salyer |
| 4,825,939 A | 5/1989 | Salyer et al. |
| 4,853,270 A | 8/1989 | Wycech |
| 4,856,294 A | 8/1989 | Scaringe et al. |
| 4,900,617 A | 2/1990 | Smith |
| 4,935,294 A | 6/1990 | Misevich et al. |
| 4,939,020 A | 7/1990 | Takashima et al. |
| 5,053,446 A | 10/1991 | Salyer |
| 5,069,358 A | 12/1991 | Avery, Jr. |
| 5,106,520 A | 4/1992 | Salyer |
| 5,155,138 A | 10/1992 | Lundqvist |
| 5,211,949 A | 5/1993 | Salyer |
| 5,224,356 A | 7/1993 | Colvin et al. |
| 5,254,380 A | 10/1993 | Salyer |
| 5,282,994 A | 2/1994 | Salyer |
| 5,290,904 A | 3/1994 | Colvin et al. |
| 5,356,853 A * | 10/1994 | Ueno et al. ................. 156/235 |
| 5,360,826 A | 11/1994 | Egolf et al. |
| 5,366,801 A | 11/1994 | Bryant et al. |
| 5,415,222 A | 5/1995 | Colvin et al. |
| 5,499,460 A | 3/1996 | Bryant et al. |
| 5,571,592 A | 11/1996 | McGregor et al. |
| 5,609,954 A * | 3/1997 | Aizawa et al. ........... 428/317.5 |
| 5,677,049 A * | 10/1997 | Torii ......................... 428/155 |
| 5,722,482 A | 3/1998 | Buckley |
| 6,207,738 B1 | 3/2001 | Zuckerman et al. |

OTHER PUBLICATIONS

Search results obtained from a search of public patent databases (pp. 2–99) conducted on Jul. 16, 1993, (pp. 5–51) conducted on Jul. 19, 1993, and (pp 2–17) conducted on Nov. 1, 1993.*

Material Safety Data Sheet–Microencapsulated N–Octadecane Jan. 31, 1992, Microtek Laboratories, Inc., Dayton, Ohio 45403.*

Material Safety Data Sheet–Microencapsulated Kenwax19–Filter Cake, Nov. 29, 1994, Microtek Laboratories, Inc., Dayton, Ohio 45403.*

"Material Safety Data Sheet–Microencapsulated N–Octadecane" effective date Jan. 31, 1992, Microtek Laboratories, Inc., Dayton, Ohio 45403.

"Material Safety Data Sheet–Microencapsulated Kenwax19–Filter Cake" effective date Nov. 29, 1994, Microtek Laboratories, Inc., Dayton, Ohio 45403.

* cited by examiner

FABRIC COATING CONTAINING ENERGY ABSORBING PHASE CHANGE MATERIAL AND METHOD OF MANUFACTURING SAME

RELATED APPLICATION

This is a division of application Ser. No. 08/477,824 filed on Jun. 7, 1995 now abandoned.

Above-mentioned application Ser. No. 08/477,824 filed on Jun. 7, 1995 now abandoned is a continuation-in-part of U.S. patent application Ser. No. 08/259,964 filed Jun. 14, 1994 for FABRIC COATING CONTAINING ENERGY ABSORBING PHASE EXCHANGE MATERIAL AND METHOD OF MANUFACTURING SAME now abandoned which is incorporated by reference herein, in its entirety.

FIELD OF THE INVENTION

This invention relates to substrate coatings containing energy absorbing, temperature stabilizing phase change materials and methods of manufacturing same. More particularly, this invention relates to fabric coatings containing microspheres of phase change material dispersed in a polymer binder and methods of manufacturing same.

BACKGROUND OF THE INVENTION

Coatings are typically applied to fabrics to increase water resistance, water transport, insulative ability or heat storage properties of the fabrics. Recently, microencapsulated phase change materials have been described as a suitable component for fabric coatings when exceptional heat transfer and storage capabilities are desired. In particular, International Patent Application No. PCT/US93/05119 for "Fabric with Reversible Enhanced Thermal Properties" to Colvin, et al., which is incorporated herein by reference, discloses that fabrics coated with a binder containing microcapsules filled with energy absorbing phase change material enables the fabric to exhibit extended or enhanced heat retention or storage properties.

Research has demonstrated that applying a binder containing microspheres of phase change materials with commercial coating equipment can be problematic. For example, use of solvent based gravure printing techniques in which a solvent system was employed to achieve uniform dispersion of the microspheres in a binder proved unsuccessful because the solvent systems damaged the microspheres.

Thermoplastic gravure printing techniques also proved unsatisfactory for use with microspheres of phase change material. When using higher temperature thermoplastic gravure printing techniques, sustained temperature of 325° F. caused severe damage to the microspheres. Although lower temperature thermoplastic gravure printing techniques avoided significant damage to the microspheres, the resulting coating was found lacking in washability and durability. Moreover, lower temperature thermoplastic gravure printing techniques precluded addition of the desired amounts of the microspheres, allowing addition of microspheres of up to only about 20% by dry weight of the microsphere/binder material. This low percentage of phase change material in the coating makes the coating susceptible to undesirable heat transfer across the coating, especially in locations where phase change material is sparsely applied.

Attempts to encapsulate microspheres of phase change materials in a thermoplastic spray have also proved unsatisfactory. In particular, scattering microspheres into a stream of sprayed, fibrous thermoplastic material resulted in a binder matrix that did not fully encase the microspheres. The resulting binder/microsphere material was susceptible to loss of microspheres, which worked loose and were continually shedded from the fabric. In addition, the coating lacked uniformity of thickness and microsphere distribution.

Attempts were also made to utilize thermoplastic extrusion techniques to create a film of continuous web in which microspheres of phase change material were uniformly distributed. However, thermal breakdown of the microspheres resulted from the higher temperatures utilized. The extrusion screw employed with these techniques also physically damaged the microspheres.

Phase change materials in microencapsulated form are commonly supplied as a dry powder. This powder is difficult to wet and uniformly disperse in aqueous systems. Moreover, some microencapsulated phase change materials have an internal layer of modified gelatin which is hydrophilic and capable of absorbing its own weight in water. Not only does the hydrophilic quality of such microcapsules make more standard component proportions inapplicable, microcapsules which have absorbed water tend to swell and associate, increasing the viscosity of the coating system above acceptable limits. Although the precise behavior of microcapsules in the coating system which have absorbed water is uncertain, it is believed that such microcapsules agglomerate, reducing their dispersion throughout the binder of the coating system, which de-stabilizes the binder. This de-stabilization can increase over time. When latex binders are used with microencapsulated phase change material, de-stabilization of the latex binder can continue until the latex binder coagulates.

U.S. Pat. Nos. 5,254,380, 5,211,949, 5,282,994 and 5,106,520 for "Dry Powder Mixes Comprising Phase Change Materials" describe free flowing, conformable powder-like mixes of silica particles and a phase change material which the silica particles of between $7 \times 10^{-3}$ to $7 \times 10^{-2}$ microns are mixed with phase change material in a ratio of up to 80% by weight of phase change material. While these patents describe a matrix in which microspheres of phase change materials need not be separately encapsulated, they do not describe the use of dry powder mixes containing phase change materials in binder matrices for coating fabrics.

Research has further demonstrated that in applying a binder containing microspheres of phase change materials directly to a fabric, a significant amount of binder must be applied if a high content of microencapsulated phase change material is desired. For some commercial uses, however, a thick, exposed coating layer may be undesirable for the finished product.

This problem can be overcome in certain applications by insertion or lamination of the exposed coating between external sheets, substrates or fabrics of the finished product. Such constructions prevent the coating from contact with the end-user or exposure to view. The finished products necessarily contain additional layer(s) of substrate, whose function is, at least in part, to cover the otherwise exposed coating. In the case of a jacket lining or footwear insert, such a construction is not problematical. In other applications, however, it may be undesirable to have an additional covering layer which may needlessly add weight and/or bulk to the end product.

For certain other applications, it is desirable to use highly extensible fabrics. Typically, these fabrics have an ultimate elongation at break (UE) of more than 20%. Examples of extensible fabrics include knits, fabrics made from crimped or texturized yards, and fabrics made from rubber or polyurethane based yarns (such as Spandex™, made by E. I. duPont de Nemours, Co.). Garments such as stockings, undergarments, sweaters, T-shirts, gloves, wet-suits, etc. must be extensible if they are to be put on easily and worn comfortably.

If a coating to be applied to an extensible fabric contains encapsulated phase change materials and has a UE much less than that of the fabric, the coating will prevent the coated fabric from stretching and making it stiff and unacceptable for use. On the other hand, if the modulus of elongation of the coating/phase change material is too high, it may make the coated fabric stiff or boardy and unsuitable for the end use.

The aforementioned problem may be solved by making a coating which is weak and has a very low UE. When such a weak coating is stretched, it breaks in many places. While this has the advantage of making the coating breathable, the product will exhibit a stiff hand until the coating is broken, after which the hand will vary from place to place on the fabric and the coating will be unsightly and may be unacceptable to consumers. In addition, the broken coating will be less resistant to wear and cleaning, pieces of the coating may break off or wear off. Finally, the portions of the stretched fabric which are no longer covered by coating will not have desired thermal properties, reducing the effectiveness of the phase change material.

It is well known that adding non-extensible particles, such as filler, reinforcements, or microencapsulated phase change materials to an elastomeric binder, reduces the UE of the composition and stiffens it. The amount of change depends principally upon the relative volumes of the filler and the elastomer, the amount of adhesion between the filler and the elastomer, and the dispersion of the filler in the elastomer. Moreover the effect of filler concentration on UE is non linear. As filler is increased, the UE falls off moderately until a concentration is reached where the UE is reduced drastically. The concentration at which the UE falls drastically depends upon the filler (as above) and upon the elastomer.

In general, it appears that coatings applied under tension to fabric may result in a coated product which does not exhibit the full stretch and recovery required for the most exacting applications. In addition, it has been found then that when binders containing a 40–50% phase change material content are applied by means of direct coating methods to stretch fabrics, the fabric tends to neck down before reaching the coating head and after being unrolled from the bolt upon which it is stored. The coating is then applied to the necked down fabric at the coating head, after which the coating is susceptible to cracking when the fabric is later stretched during manufacture or use. Even when the coating doesn't crack, it may limit the natural stretchability of the fabric, as described above.

It is against this background that the significant improvements and advancement of the present invention have taken place in the field of fabric coatings containing energy absorbing, temperature stabilizing phase change materials and methods of manufacturing same.

OBJECTS OF THE INVENTION

It is the principal object of the present invention to provide an improved fabric coating composition containing phase change material of a density sufficient to effect or control heat and energy transfer across the coating and/or store heat in the coating.

It is another object of the present invention to provide a coating composition of the foregoing character which will maintain substantially all of the breathability, flexibility or other principal qualities of the fabric to which it is applied.

It is a further object of the present invention to provide coated fabrics having the aforementioned properties which are resistant to heat, pressure and chemicals encountered during the coating process.

It is a still further object of the present invention to provide coated fabrics having the aforementioned qualities which are durable, resistant to heat, moisture, solvents, laundering, and/or dry cleaning, without degradation to or loss of the phase change material.

It is still another object of the present invention to provide an improved method of applying coating compositions containing phase change materials and having the aforementioned qualities as coatings on fabrics by utilizing commercially available equipment.

It is yet another object of the present invention to provide an improved method of applying coatings containing phase change materials to fabrics without damage or degradation to the phase change materials.

It is still another object of the present invention to provide an improved method for evenly dispersing phase change material throughout a binder and maintaining an even distribution of the phase change material while coating a fabric with the binder and phase change material dispersion.

It is still another object of the present invention to develop a coating formulation and method suitable for application of a binder and phase change material composition to extensible fabrics.

It is a yet further object of the present invention to achieve the aforementioned objects which producing a coated fabric which is atheistically pleasing.

SUMMARY OF THE INVENTION

The present invention comprises coatings for fabrics and methods for manufacturing the same. A preferred coating includes wetted microspheres containing a phase change material dispersed throughout a polymer latex binder, and including a surfactant, a dispersant, an antifoam agent and a thickener. Preferred phase change materials include paraffinic hydrocarbons. To prepare a preferred coating composition of the present invention, microspheres containing phase change material are dispersed in an aqueous solution of a surfactant, a dispersant, and an antifoam agent mixture, followed by dispersion in a polymer mixture to form a coating composition. An alternative method of preparing the coating composition of the present invention includes dispersing microspheres containing phase change material in wet cake form in an aqueous solution of a surfactant, a dispersant, antifoam agent and polymer to form a coating composition. The coating composition of the present invention are then applied as a coating on a fabric.

In an alternative embodiment, a substrate is coated with an extensible binder containing microencapsulated phase change material to form an extensible, coated fabric. A preferred binder contains latex and a preferred substrate is an extensible fabric. The coated substrate is optionally flocked. When the coated product is an extensible fabric, transfer coating techniques are preferably employed.

DETAILED DESCRIPTION OF THE INVENTION

In accordance with the present application, it has been discovered that wetting microspheres of phase change materials with water and maintaining a uniform dispersion of the microcapsules in a wet coating minimizes or eliminates the tendency of such microspheres to destabilize the binder polymer in which the microspheres are dispersed.

A coating composition which includes microspheres containing a phase change material is prepared by mixing dry microspheres with an excess of water to induce the microspheres to swell with water until swelling is complete. Preferably, a surfactant and a dispersant are added to the water prior to mixing with the microspheres. The surfactant decreases surface tension of the layers of the microspheres and thereby promotes wetting of the microspheres. An antifoam agent is added to and mixed slowly with the microsphere/water mixture to remove air trapped as dispersed bubbles in the mixture. A thickener is added to adjust the viscosity of the mixture to prevent the microspheres from floating or sinking in the mixture. A viscosity of at least 500 cps is preferred. Adjusting the pH of the mixture to 8.5 or greater promotes swelling of the microspheres. Swelling is typically complete in from 6 to 24 hours, at which time the microspheres will have reached an equilibrium with the aqueous phase in which they are dispersed. Thereafter, the microsphere dispersion is added to a mixture of a polymer dispersion, surfactant and dispersant having a pH approximately the same as the pH of the microsphere dispersion. The viscosity and rheology of the resulting coating compound is adjusted to meet the requirements of the coating method employed.

The polymeric binder may be in the form of a solution, dispersion or emulsion in water or in organic solvent. The polymeric binder may initially be polymeric, or in the form of monomers and/or oligomers, or low molecular weight polymers which upon drying and/or curing are converted to their final molecular weight and structure. These binders are preferably film-forming, elastomeric, and have a glass transition temperature in the range of about −45° C. to +45° C., depending upon the desired application. For most garment applications, an elastomeric polymer with a glass transition temperature of about −30° C. to about +12° C. is preferred.

The polymers may be linear or branched. Copolymers may be random, block or radial. The polymers may have pendant reactive groups, reactive ends or other crosslinking mechanisms, or be capable of entanglement and/or hydrogen bonding in order to increase the toughness of the finished coating and/or its resistance to heat, moisture, solvents, laundering, dry-cleaning or other chemicals.

Suitable monomers include, but are not limited to, acrylic esters (preferably alkyl-acrylates and methacrylates containing 4 to 17 carbon atoms); styrene; isoprene; acrylonitrile; butadiene; vinyl acetate; vinyl chloride; vinyldiene chloride; ethylene; butylene; propylene; chloroprene; etc. Polymers and copolymers based upon the above mentioned monomers and/or upon silicone; epoxy; polyurethane; fluorocarbons; chlorosulfonated polyethylene; chlorinated polyethylene; and other halogenated polyolefins are also useful.

The surfactant described above has a preferred wetting time of not greater than 50 seconds at a concentration of 0.10% by the Draves Wetting Test. Nonionic and anionic surfactants are acceptable. Dioctyl sodium sulfosuccinamate (sometimes referred to herein as "DOS") is a preferred surfactant.

The dispersing agent employed as described above is preferably a nonionic or anionic dispersant, such as dispersants based upon phosphate esters. A 90% solution of the potassium salt of a phosphated coaster of an alcohol and an aliphatic ethoxylate such as Strodex PK90™ available from Dexter Chemical Company of New York City, N.Y. is a preferred dispersant.

From 0.1% to 0.8% by weight of dry DOS to dry microspheres and from 0.1% to 0.8% by weight of dry PK90™ to dry microspheres is effective. The total amount of DOS and PK90™ is preferably apportioned equally between the dry microsphere dispersion and the polymer dispersion to which the microspheres will be added after swelling is complete.

Suitable thickeners include polyacrylic acid, cellulose esters and their derivative, polyvinyl alcohols, and others known in the art. A preferred thickener is Acrysol ASE60™ available from Rohm and Haas Company of Philadelphia, Pa. ASE60™ is preferably obtained as a 28% solution of an alkali-swellable polyacrylic acid which increases in viscosity upon neutralization. As described above, thickener is added first to achieve the desired viscosity of the microsphere dispersion, which will vary depending on the particular phase change material selected, and then to adjust the wet coating to meet the requirements of the coating method employed.

Preferred antifoam agents include aqueous dispersions of silicone oil, such as polydimethylsiloxane, containing dispersed fine particle silica, and mixtures of mineral oil, surfactant and fine particle silica, such as AF 9020™ available from General Electric Company of Waterford, N.Y., and Advantage 831™ available from Hercules Chemical Company of Wilmington, Del.

A preferred polymer binder is made with a dispersed polymer latex is an anionic, heat reactive, acrylic latex containing 59% non-volatiles in water, such as the acrylic polymer latex marketed under the trade name Hycar XT9202™ and available from B. F. Goodrich Chemical Company of Cleveland, Ohio. The polymer latex has a glass transition temperature of −25° C. When properly dried and cured, fabric coatings made from polymer latex such as Hycar XT9202™ are washable and dry-cleanable.

The coating compositions of the present invention preferably include from 30 to 500 parts by dry weight of microspheres for each 100 parts by dry weight of acrylic polymer latex. The coating compositions preferably include from 0.005% to 6% dry weight each of surfactant and dispersant to dry weight of microspheres. Water is added to total 25% to 80% of the final wet coating composition. An antifoam agent of from 0% to 1% dry weight to total weight of the final wet coating composition is preferred. The most preferred ratios of components of the coating composition of the present invention are: 70 to 300 parts by dry weight of microspheres for each 100 parts by dry weight of acrylic polymer latex, 0.1% to 1% dry weight each of surfactant and dispersant to dry weight of microspheres, water totaling 40% to 60% of the final wet coating composition and antifoam agent of from 0.1% to 0.5% dry weight to total weight of the final wet coating composition.

An alternative method utilizes microspheres of phase change material which are not completely dried during the manufacturing process. Wet microspheres containing from about 25% to about 65% by weight water are preferred and can be readily handled. When using such microspheres, a surfactant and a dispersant are added to a polymer binder dispersion before the wetted microspheres are dispersed therein. DOS and Strodex PK90™ are preferably mixed with the polymer binder dispersion before the wet microspheres are mixed with and dispersed therein.

Generally speaking, phase change materials have the capability of absorbing or releasing thermal energy to reduce or eliminate heat transfer at the temperature stabilizing range of the particular temperature stabilizing material. The phase change material inhibits or stop the flow of thermal energy through the coating during the time the phase change material is absorbing or releasing heat, typically during the material's change of phase. This action is transient, i.e., it will be effective as a barrier to thermal energy until the total latent heat of the temperature stabilizing material is absorbed or released during the heating or cooling process. Thermal energy may be stored or removed from the phase change material, and can effectively be recharged by a source of heat or cold. By selecting an appropriate phase change material, a fabric can be coated for use in a particular application where the stabilization of temperatures is desired. Two or more different phase change materials can be used to address particular temperature ranges and such materials can be mixed.

Paraffinic hydrocarbon phase change materials suitable for incorporation into fabric coatings are shown below in Table I. The number of carbon atoms contained in such materials and is directly related to the melting point of such materials.

TABLE I

| | NO. CARBON ATOMS | MELTING POINT ° C. |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Phase change materials such as the listed paraffinic hydrocarbons are preferably formed into microspheres and encapsulated in a single or multi-layer shell of gelatin or other materials. Encapsulated microshere diameters of from 1 to 100 microns are preferred, most preferably in the range 10 to 60 microns. Encapsulated microspheres containing phase change materials are sometimes referred to herein as "microPCMs." Microspheres may also be bound in a silica matrix of sub-micron diameters. Microspheres containing n-octadecane or n-eicosane are suitable for fabric coatings for clothing. Such microspheres are available from MacGill Enterprises, Inc. of West Milton, Ohio and Microtek Laboratories, Inc. of Dayton, Ohio.

EXAMPLE I

A preferred coating formulation where high phase change material content and limited extensibility is required, for example with non- or low-stretch fabrics such as non-woven or woven fabrics, is prepared as shown in Table II.

TABLE II

| COMPONENT | WT % | DIRECTIONS |
|---|---|---|
| MICROSPHERE DISPERSION: | | |
| Water | 35.00 | |
| 75% DOS | 0.40 | |
| Strodex PK90 (90% NV) | 0.20 | |
| n-Eicosane microspheres (dry) | 36.50 | |
| Acrysol ASE60 (28% NV) | 1.00 | Mix, dispersing ingredients well. |
| AF9020 (20% NV) | 0.05 | Mix slowly with dispersed ingredients until foam dissipates. |
| Ammonium hydroxide (28%) | 0.50 | Add slowly to the defoamed dispersion, with good mixing. Let stand 6 hours. Remix immediately before use. |
| POLYMER BINDER DISPERSION: | | |
| Hycar XT9202 latex polymer | 21.35 | |
| 75% DOS | 0.20 | |
| Strodex PK90 | 0.10 | |
| Acrysol ASE60 (28% NV) | 3.40 | |
| Hercules Advantage 831 | 0.30 | Mix ingredients slowly until foam dissipates. |
| COATING: | | |
| Ammonium Hydroxide | 1.00 | Slowly add Microsphere Dispersion to Polymer Binder Dispersion; add ammonium hydroxide slowly with good mixing thereto. |

EXAMPLE II

An alternative coating formulation where high phase change material content and limited extensibility is required, for example with non- or low-stretch fabrics such as non-woven or woven fabrics, is prepared as shown in Table III.

TABLE III

| COMPONENT | WT % | DIRECTIONS |
|---|---|---|
| Hycar XT9202 | 21.00 | |
| 75% DOS | 0.40 | |
| Strodex PK90 (90% NV) | 0.33 | Mix. |
| 50% wet n-Octadecane microspheres | 72.00 | Add slowly to latex polymer mixture, with good mixing, dispersing microspheres well. |
| Acrysol ASE60 (28% NV) | 4.40 | |
| AF9020 (20% NV) | 0.05 | |
| Hercules Advantage 831 | 0.30 | Mix ingredients slowly until foam dissipates. |
| Ammonium Hydroxide (28%) | 1.52 | Add slowly, with good mixing. |

Addition of microspheres as described above in the preferred weight ratios eliminates tack and prevents blocking of the coated fabrics typically experienced with coatings having low glass transition temperature polymers such as those based on acrylic latex polymers. Tack, the tendency of material to stick to itself, can make rolls of coated fabric difficult to unroll. This can occur when rolls of coated fabric are stored in warm places or are stored under pressure of rolls stacked on top of one another. Antiblocking additives are typically added to coating formulations to prevent tack. The presence of microspheres in the coatings of the present invention eliminates the need for antiblocking additives.

Non-foam coating compositions like those described in Examples I and II above are suitable for application to substantially non-extensible fabrics of both woven and non-woven construction. A preferred coated fabric is produced using the non-foam coating like that of Example I and a 100% polyester, non-woven fabric having a weight of 0.8 oz/sq yd. A preferred fabric selected is HEF™ (a hydro-entangled fiber) obtained from Veretec™ of Bethune, S.C. Similar fabrics are available from duPont de Nemours Company. Using a wet coating composition containing 50% by dry weight of microspheres, a knife-over-roll coating head configuration is employed. A desired weight of 2.5 oz dry weight of microspheres/sq yd is obtained with a knife-over roll gap of 0.022 inches off the fabric. The coating line speed is 8 linear yards per minute. The coating is cured at a temperature of approximately 260° F.

EXAMPLE III

A preferred foam coating formulation of the present invention may be used with breathable fabric to maintain the heat and moisture dissipation capability of the fabric. In this example, the materials are subject to mechanical frothing. Foam stabilizers are added to maintain the foam after application to the fabric. Foam stabilizers may be inorganic salts of fatty acids or their sulfate partial esters, anionic surfactants, among other compounds. Preferred foam stabilizers for use with phase change material microspheres are sodium lauryl sulfate, ammonium stearate, di-sodium-n-octadecyl sulfosuccinamate and mixtures thereof. Ammonium stearate concentrations (dry as a percent of wet coating) of 0.5% to 6% plus 0.2% to 4% sulfosuccinamate are most preferred. The coatings are prepared as shown in Table IV.

TABLE IV

| COMPONENT | WT % | DIRECTIONS |
|---|---|---|
| Water | 4.69 | |
| 75% DOS | 0.20 | |
| Strodex PK90 (90% NV) | 0.17 | |
| Hycar XT9202 | 33.74 | |
| 35% wet n-Octadecane microspheres | 54.53 | Add slowly to above ingredients, dispersing microspheres well. |
| AF9020 (20% NV) | 0.05 | Mix slowly, until foam dissipates. |
| Acrysol ASE60 (20% NV) | 1.55 | |
| Hercules Advantage 831 (28% NV) | 0.23 | Mix ingredients slowly until foam dissipates. |
| Ammonium Hydroxide (28%) | 0.60 | Add slowly while mixing. Do not mix in air. |
| Ammonium Stearate (33%) | 2.96 | |
| Di-sodium-n-octadecyl-sulfosuccinamate (35%) | 1.28 | Add slowly, with good mixing. |

Preferred foam coatings contain ammonium stearate in an amount by dry weight of from 0.25% to 10% of the total weight of the final wet coating composition foam is preferred and from 0.1 to 8% dry weight of sulfosuccinamate to total weight of the final wet coating composition foam. Most preferably, ammonium stearate by dry weight 1% to 3% of the total weight of the final wet coating composition foam and the sulfosuccinamate by dry weight comprises from 0.3 to 2% dry weight to total weight of the final wet coating composition foam.

The liquid coating is mechanically foamed by pumping through an Oakes mixer or similar mechanical foamer. The mixer injects air into the liquid and finely disperse the air. The foamed liquid is pumped to a coating head, usually a knife coater, where it is spread onto the fabric. The fabric/foam coating is then passed through a heated oven to dry and cure the foam.

Foam coating compositions like those described in Example III are also suitable for application to substantially non-extensible fabrics of both woven and non-woven construction when maintaining breathability of the fabric is desired. A preferred methodology includes applying the foam coating of Example III to HEF™ having a weight of 1¼ oz/sq yd. The wet coating composition of Example III is foamed to a preferred blow ratio of air to wet compound of 2:1, with acceptable blow ratios ranging from ½:1 to 10:1. A knife-over-roll coating head configuration is employed. The desired weight of 0.5 oz dry weight of microspheres/sq yd is obtained with a knife-over roll gap of 0.018 inches off the fabric. The fabric is drawn through the coating line at a rate of 10 linear yards per minute. The coating is cured at a temperature of approximately 260° F., with the fabric carried on a tenter frame to prevent shrinkage of the fabric.

EXAMPLE IV

Tests were conducted on acrylic fleeces in which the fibers containing microPCMs, and on non-woven materials (sometimes referred to herein as "substrate") having a coating containing microPCMs. Acrylic fleeces without microPCMs having approximately the same weight per unit area as the fleeces with microPCMs, and substrates without microPCMs having the same thickness as the non-woven substrates having a coating containing microPCMs, served as comparison materials. Specific data regarding the sample materials tested are included in Table V.

TABLE V

| Materials Tested | Acrylic with PCM | Acrylic without PCM | Substrate with PCM | Substrate without PCM |
|---|---|---|---|---|
| Wt/unit area (g/m$^2$) | 270 | 250 | 227 | 207 |
| Stand thickness (mm) | 5.40 | 5.63 | 0.63 | 0.61 |
| Compressibility (lbs) | 12 | 16 | 13 | 20 |
| Raw density (kg/m$^3$) | 49 | 44 | 360 | 339 |

The content of microPCM in the acrylic fleeces was approximately 10 per cent. About 7 g/m$^2$ microPCM was included in the coating of the non-woven substrate. This is equal to a content of microPCM of about 3%. The phase change temperature of the microPCM material ranged from about 22° C. to about 25° C.

Tests of water-vapor permeability and water-vapor absorption of the materials were based upon the test methods of the standards DIN 53 332 and DIN 53 333. The tests of the water-vapor permeability were carried out under constant climatic conditions of 23° C. temperature and 40% relative humidity. The water-vapor absorption of the materials was tested at a constant environmental temperature of 23° C. at varying relative humidities. The following thermophysical parameters of the materials were measured: thermal conductivity (A); thermal resistance (R); temperature conductivity (a); and specific thermal capacity (c).

Test results indicated that the water-vapor permeability is not influenced by the incorporation of microPCMs. The acrylic fleeces tested possess a water-vapor permeability of about 5 mg/cm$^2$/h as a result of the material structure. The non-woven substrate to which the microPCM layer is applied is with about 0.75 mg/cm$^2$/h, nearly impermeable for water-vapor.

The water-vapor absorption of the samples is primarily determined by the absorption ability of the basic material. The incorporated microPCM causes a slight increase of the water-vapor absorption under the same climatic conditions. The water-vapor absorption of the acrylic fleece without microPCM was about 1.5% at a temperature of 23° C. and a relative humidity of 80%. The acrylic fleece with microPCM absorbs about 0.3% more water-vapor under the same conditions.

Tests of heat insulation and the heat storage were carried out under varying temperatures humidity and static pressure. Test conditions with a material temperature in the phase change range of 24° C., a material humidity that results from 30% air humidity and a pressure of 1 kPa were selected as a starting point for the measurements. Table VI is a summary of the test results.

TABLE VI

| thermophysical parameters | Acrylic with PCM | Acrylic without PCM | Substrate with PCM | Substrate without PCM |
|---|---|---|---|---|
| A (w/m K) | 0.0398 | 0.0342 | 0.1012 | 0.1782 |
| R (m$^2$ K/W) | 0.1281 | 0.1491 | 0.0057 | 0.0029 |
| c (kJ/kg K) | 3.022 | 2.391 | 2.468 | 1.840 |

As shown above in Table VI, materials with incorporated microPCM possess an essentially higher heat storage than the comparison material. The heat insulation of the compact non-woven substrate is enhanced by the microPCM coating. The heat insulation of the acrylic fleece is mainly determined by the air enclosed in the material as a result of the dispersed structure of the fabric.

It has been determined that the heat insulation properties of the materials containing microPCM remain nearly constant in the temperature range of the specific phase change, in contrast to the behavior of materials which do not contain microPCM. The variation of the heat insulation of the materials with microPCM is essentially lower contrary to the comparison material in changes of material humidity. The materials with microPCM possess when raising the pressure on the textile a lower decrease in the heat insulation than the comparison material due to a lower compressibility of the materials with microPCM.

To determine the protection effect of the samples, the samples were brought in contract with a 70° C. tempered plate after cooling under the phase change temperature. The time required to reach a temperature equivalent to the pain threshold of the human skin on back of the sample was determined. The higher protection effect for the materials with microPCM was confirmed.

EXAMPLE V

A preferred coating formulation in situations where a medium level of phase change material content is desired and high extensibility must be maintained, for example with medium- or high-stretch fabrics such as melt blown polyester stretchable fabrics, knit fabrics, including warp knit fabrics, is prepared as shown in Table VII.

TABLE VII

| COMPONENT | WT % | DIRECTIONS |
|---|---|---|
| MICROSPHERE DISPERSION: | | |
| Water | 21.54 | |
| 75% DOS | 00.80 | |
| Strodex PK90 (Dexter Chemical; 90% NV) | 00.40 | |
| Polyoxyethylene 20POE oleyl ether 20% NV | 2.10 | |

TABLE VII-continued

| COMPONENT | WT % | DIRECTIONS |
|---|---|---|
| Dry beads containing octadecane | 17.80 | |
| Acrysol ASE60 28% NV | 00.60 | disperse above ingredients well |
| AF9020 | 00.10 | mix slowly until foam dissipates then add slowly w/good mixing |
| Ammonium Hydroxide (28%) | 1.00 | let stand for 6 hours, remix immediately before use |
| POLYMER BINDER DISPERSION: | | |
| Low Ammonia Natural Latex 62% NV | 38.50 | |
| 10% Potassium Hydroxide | 2.00 | |
| Water | 3.46 | |
| Ammonium Cascinate 15% NV | 2.00 | |
| Polyoxyethylene 20 oleyl ether 20% NV | 2.00 | |
| Zinc Oxide dispersion 50% NV | 1.50 | |
| Zinc di-n-butyldithiocarbamate dispersion 50% NV | 1.00 | |
| AF 9020 (General Electric Co.; 20% NV) | 00.10 | |
| Ammonium Hydroxide (28%) | 2.00 | mix polymer binder dispersion; slowly add microsphere dispersion polymer binder dispersion with good mixing; |
| Acrysol ASE60 28% NV | 3.00 | add slowly with good mixing; |

Application of the coating composition of Example V by direct coating methods, for example, by spray coating, produces generally unsatisfactory results. However, it has been discovered that transfer coating the coating composition of Example V using knife-over-roll technique to release paper for subsequent transfer to a fabric of medium extensiblity produces a satisfactory coated fabric. In one embodiment, the coating formulation of Example V, which is referred to herein as a stretchable, breathable ("SB") coating composition, was applied using knife-over-roll technique to a substantially rigid transfer paper at a loading rate which, after curing, obtained a loading rate of 2.5 oz. of encapsulated phase change material per square yard. After passing through the coating head, Demique®, an extensible fabric manufactured by Kimberly-Clark Company, was applied to the uncured coating on the coated release paper in a relatively tensionless state. The fabric was then bonded to the composition on the coated release paper by application of slight pressure as it passed through a nip roll assembly. The resulting fabric/coating paper structure was then fed through a curing oven, after which the release paper was stripped from the product leaving the Demique® fabric in an evenly coated state.

By so keeping the Demique® fabric in a nearly tensionless state, maximal extensibility and recovery were maintained after coating. In addition, the microsphere/binder coating was prevented from significantly penetrating the structure of the elastic fabric, thereby maximally maintaining the elasticity of the fabric. In general, application of the microsphere/binder dispersion to the stretch fabric using the above described transfer coating process, allowed for a controlled application of the coating to the stretch fabric without excessively penetrating the fabric, in a manner not heretofore achieved using spray coating technology.

Figure 1:
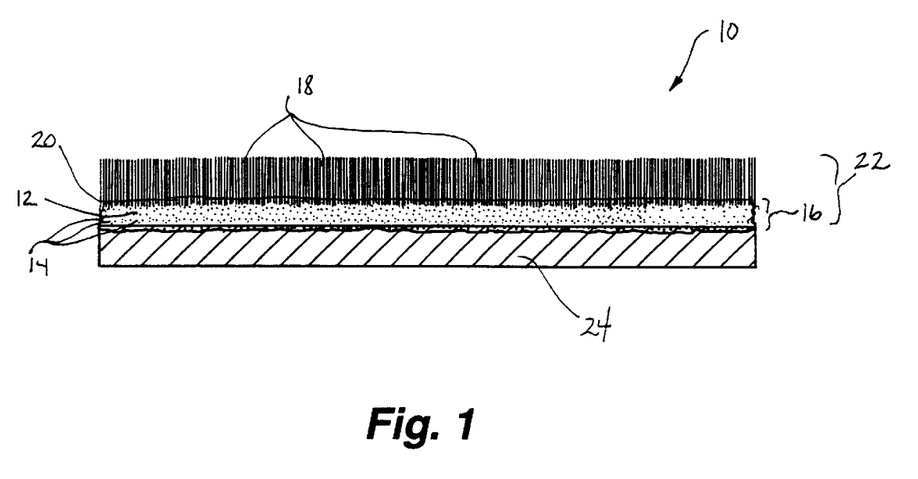
FIG. 1 is a section view of flocked coated substrate which is an alternate embodiment of the present invention.

Referring now to FIG. 1, in an alternate embodiment of the coated fabric 10 of the present invention, a SB binder 12 containing a 40% by weight content of encapsulated phase change materials 14 in the wet dispersion state is foamed, (i.e. whipped with air), to create a cellular coating 16 through which moisture vapor passes in the finished product. The coating 16 which results is referred to as a stretchable/breathable/foam (hereinafter "SBF"), and is preferably applied to a release paper (not shown) using knife-over-roll technique. The preferred loading level for the microencapsulated phase change material 14 is approximately 1½ oz. per square yard. Before the SBF coating 16 is cured, precision cut nylon fibers 18 are electrostatically charged and dropped onto a surface 20 of the uncured coating 16. The charged fibers 18 stand on end upon penetrating the coating 16 and are cured in this state, to produce a flocked coating 22 on the release paper (not shown). The release paper is removed from the flocked coating 22 and the flocked coating 22 is then applied with either heat or adhesive to an extensible fabric 24. This results in a binder/phase change material coating 16 sandwiched between the extensible fabric 24 and the flocked fibers 18. The flocking 18 adds very little weight to the finished product 10, yet gives it a velvet like appearance and feel, with the coating 16 especially useful for products requiring a high moisture vapor transmission rate, commonly referred to as breathable fabrics.

In another embodiment of the present invention, a release paper is coated with a layer of a SBF having a 40% by weight content of an encapsulated phase change material applied using transfer coating methodology to a release paper to obtain a 1¼ oz. per square yard finished weight of microencapsulated phase change material. One layer of this coating is transferred in an uncured state to a stretch fabric, for example, the Demique® fabric identified above, and the release paper removed. This coated fabric is referred to herein as a facing ply. Another layer of the coating is maintained on the release paper, flocked as described above, and cured. This flocked coating layer is referred to in here as a backing ply. The backing ply is then applied to the facing ply, with the microsphere/binder dispersion of the backing ply and of the facing ply bonded together. The resulting product has a medium to high content of phase change material of 2½ oz. per square yard but does not have exposed, tacky coating surfaces which might otherwise cause the finished product to block or adhere to itself.

Another embodiment of the present invention comprises two opposing flocked coating layers, each layer containing microencapsulated phase change materials dispersed throughout. In this embodiment, a binder/microsphere dispersion such as that described in Example V is applied to release paper to obtain a dispersion of 1¼ oz. per square yard of coating. The coating is then flocked as described above. Thereafter, release paper is removed from two sheets of identically sized coating, and the exposed coatings of each sheet are bonded together, thereby adhering each coating layer to an opposed and identical coating layer. The resulting product is a double-sided flocked material which is stable and easy to handle. Such a product is an ideal lamination substrate for use in multi-fabric applications.

In yet another embodiment of the present invention, a binder containing encapsulated phase change materials is coated to a leather substrate. A preferred encapsulated phase change material is a paraffinic hydrocarbon consisting essentially of octadecane which may be dispersed throughout an acrylic binder. Such a coated leather may be employed in the leather uppers of boots, with the coating layer facing and contacting the foot of the wearer.

Presently preferred embodiments of the present invention and many of its improvements have been described with a degree of particularity. It should be understood that this description has been made by way of preferred examples, and that the invention is defined by the scope of the following claims.

What is claimed is:

1. A method of manufacturing an extensible, coated material, comprising the steps of:

mixing a plurality of microspheres containing a phase change material with an extensible binder to form a coating composition, said phase change material being a paraffinic hydrocarbon having from 13 to 28 carbon atoms per molecule;

applying said coating composition to a release paper to produce a coated paper having an exposed coating and an opposed paper surface;

bonding said exposed coating of said coated paper to an extensible fabric to form a fabric, coating and paper laminate, said extensible fabric having an ultimate elongation at break that is greater than 20 percent; and removing said release paper from said laminate to produce said extensible, coated material.

2. The method of claim 1 further comprising the step of:

foaming said extensible binder.

3. The method of claim 1 further comprising the step of:

curing said binder after removal of the release paper.

4. The method of claim 1 wherein the binder comprises a latex.

5. The method of claim 1 wherein said extensible fabric has a coating-receiving surface, and bonding said exposed coating of said coated paper to said extensible fabric includes covering said coating-receiving surface with said exposed coating.

* * * * *

UNITED STATES PATENT AND TRADEMARK OFFICE
CERTIFICATE OF CORRECTION

PATENT NO. : 6,514,362 B1 Page 1 of 1
DATED : February 4, 2003
INVENTOR(S) : Zuckerman et al.

It is certified that error appears in the above-identified patent and that said Letters Patent is hereby corrected as shown below:

Title page,
Item [57], ABSTRACT,
Line 5, replace "The microspheres" with -- The phase change materials --.

Column 3,
Line 1, replace "yards" with -- yarns --.

Column 4,
Line 31, replace "which" with -- while --.

Column 5,
Line 53, replace "vinyldiene" with -- vinylidene --.

Column 7,
Line 54, replace "Microspheres" with -- Phase change materials --.

Signed and Sealed this

Twenty-third Day of December, 2003

JAMES E. ROGAN
*Director of the United States Patent and Trademark Office*